United States Patent [19]
Fall et al.

[11] Patent Number: 5,433,569
[45] Date of Patent: Jul. 18, 1995

[54] SCREW

[76] Inventors: James C. Fall, 9531 Melvin Ave., Northridge, Calif. 91324; Irwinch J. Schartzman, 17230 Halsted St.; Steven Schartzman, 9822 Babbitt Ave., both of Northridge, Calif. 91325

[21] Appl. No.: 116,469

[22] Filed: Sep. 2, 1993

[51] Int. Cl.$^6$ .................. F16B 23/00; F16B 25/00
[52] U.S. Cl. .................. 411/387; 411/400; 411/412; 248/217.4
[58] Field of Search .............. 411/386, 387, 400, 401, 411/412, 413, 409; 248/217.4

[56] References Cited

U.S. PATENT DOCUMENTS

| | | | |
|---|---|---|---|
| 316,650 | 4/1885 | Perkins . | |
| 907,996 | 12/1908 | Hagen | 411/409 X |
| 1,719,136 | 7/1929 | Rosenberg . | |
| 2,382,019 | 8/1945 | Miller | 411/412 X |
| 3,109,691 | 11/1963 | Burkhardt | 411/412 X |
| 3,524,378 | 8/1970 | Wieber | 411/387 |
| 4,473,984 | 10/1984 | Lopez | 411/400 X |
| 4,764,069 | 8/1988 | Reinwall et al. . | |

FOREIGN PATENT DOCUMENTS

| | | | |
|---|---|---|---|
| 2853976 | 6/1980 | Germany | 411/387 |
| 651009 | 3/1951 | United Kingdom | 248/217.4 |

OTHER PUBLICATIONS

See Accompanying Exhibits A-1 and A-2, a Screw; discussed in accompanying Disclosure Statement.

*Primary Examiner*—Neill R. Wilson
*Attorney, Agent, or Firm*—Frank L. Zugelter

[57] ABSTRACT

A self-drilling screw (10) having a body (16) that includes a driving head (18) and aperture (20) at its one end and a self-drilling tap (22) at its other end. Intermediate the length of screw (10) a solid annular member (24) comprising a peripheral edge (31) separating annular surfaces (32, 33) is formed. A plurality of radially extending serrations or teeth (36) is formed on the one annular surface (32), in a circumferential pattern paralleling the turning motion of the screw (10) in its application to a thin gauge metal deck structure (44). Two sets (26, 27) of different sized threads are formed on the body (16) between the surface (32) and the tap (22). As the serrations (36) gouged or coerce the metal during the achieving of a fully driven position for the screw (10), the larger sized threads (26) bind or tap-like to an upright boss (52) formed by the puncturing of the hole, first by the smaller sized set (27) of threads and then by the larger thread set (26). Screw (10) does not overturn to strip the thread set (26) in its larger hole (53) and a binding or tight engagement occurs between boss (52) and the threads in set (26).

13 Claims, 3 Drawing Sheets

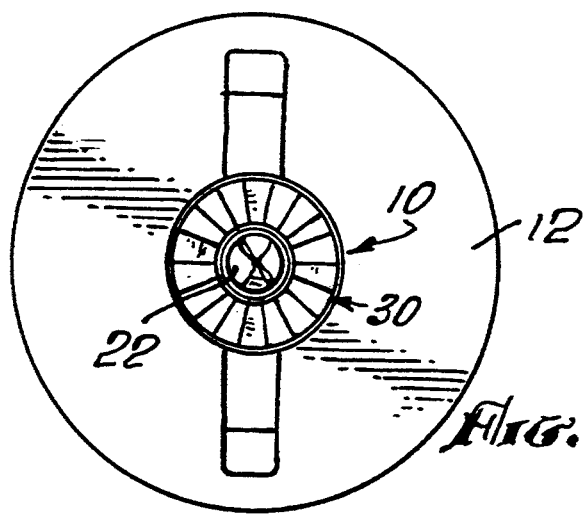
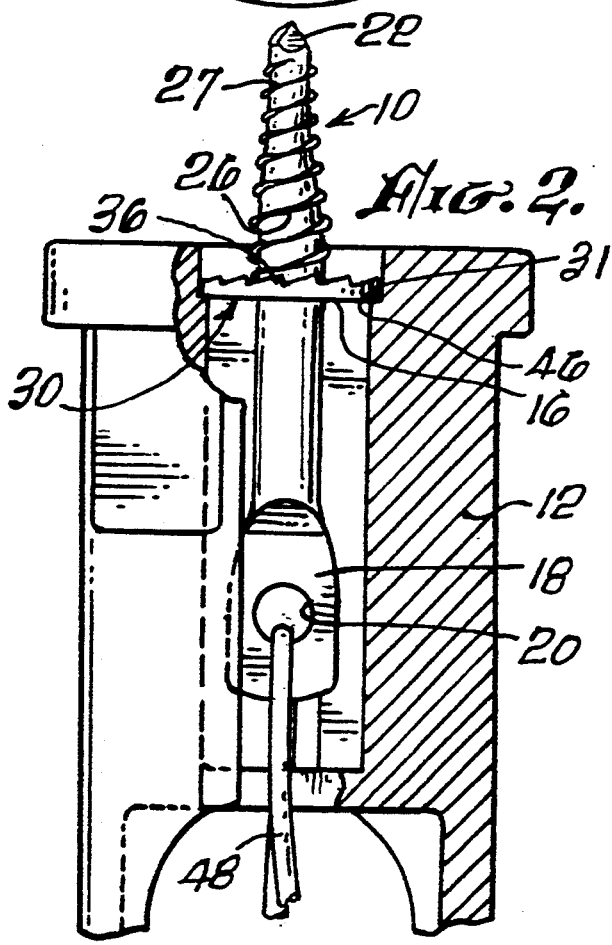
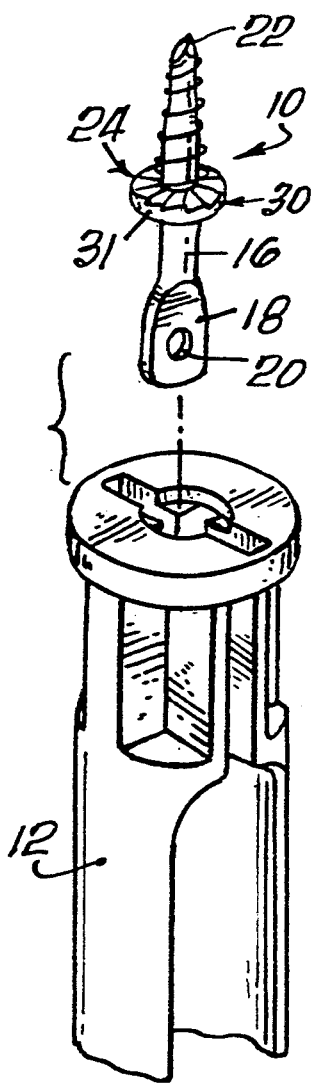
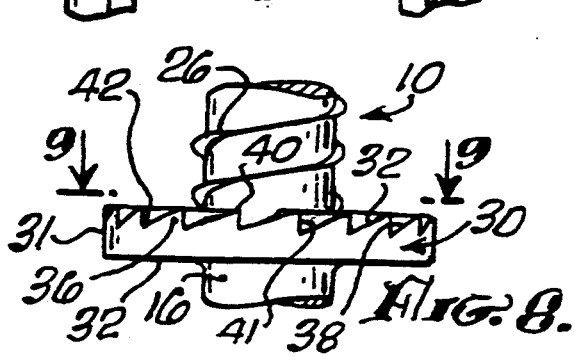
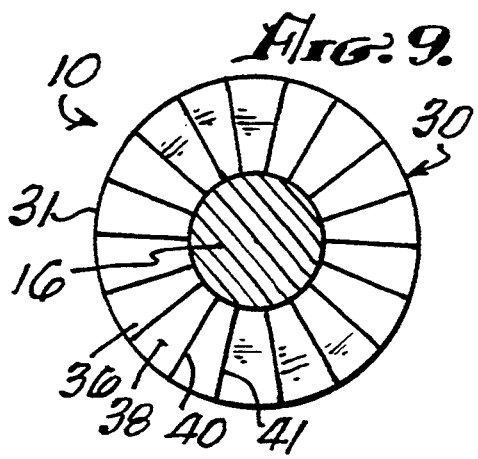

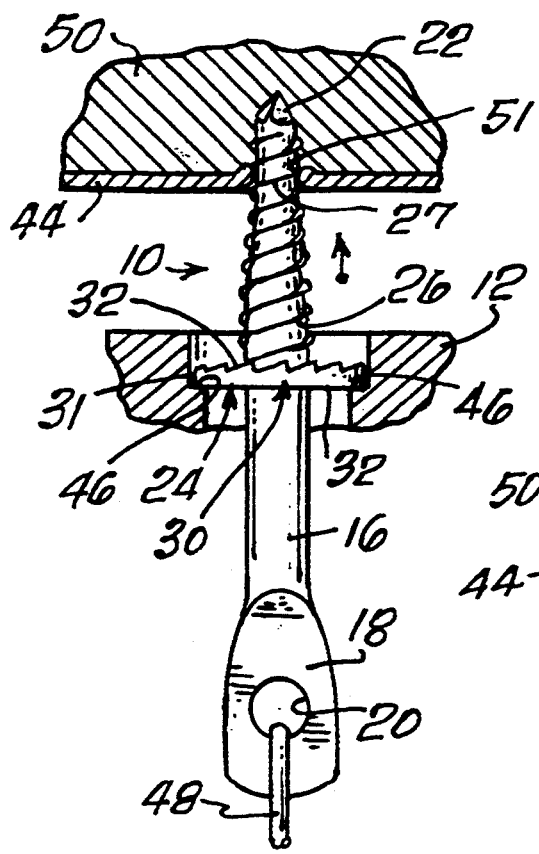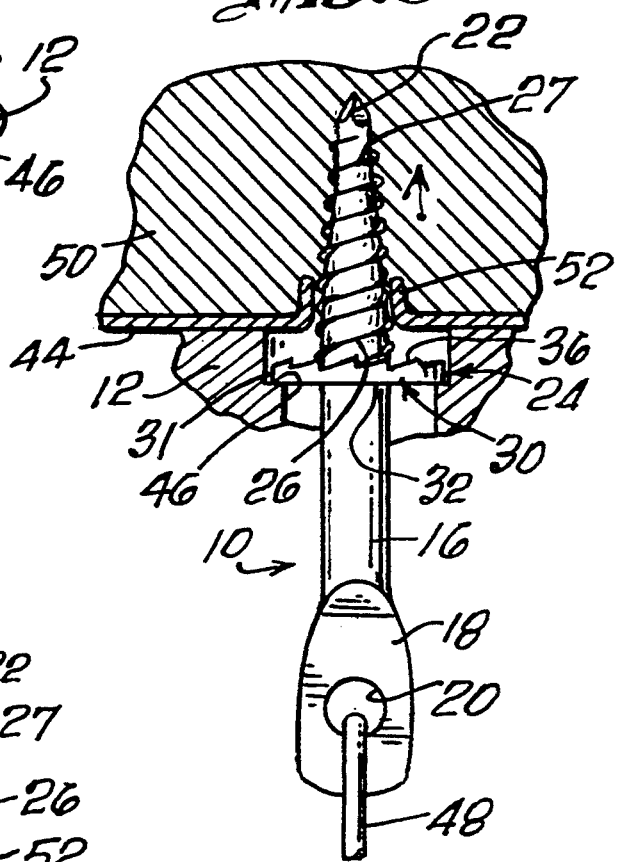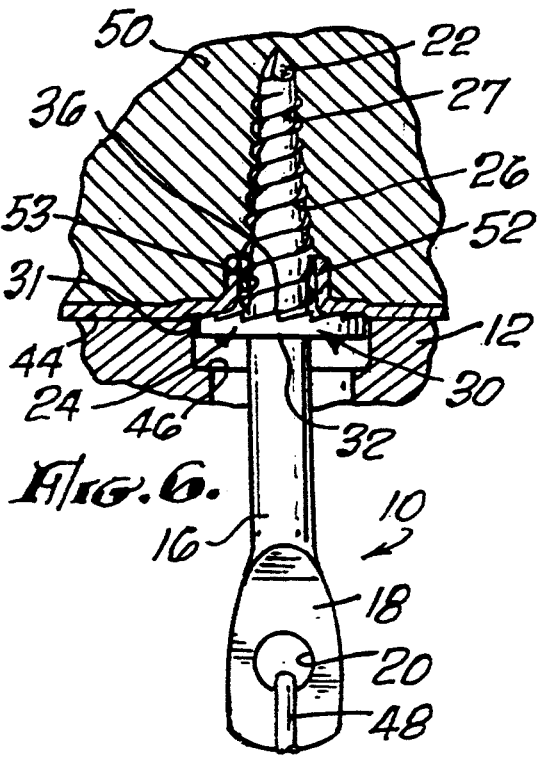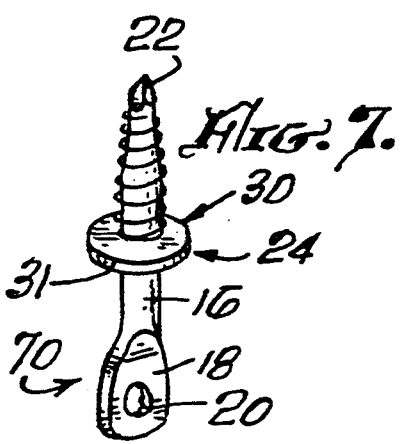

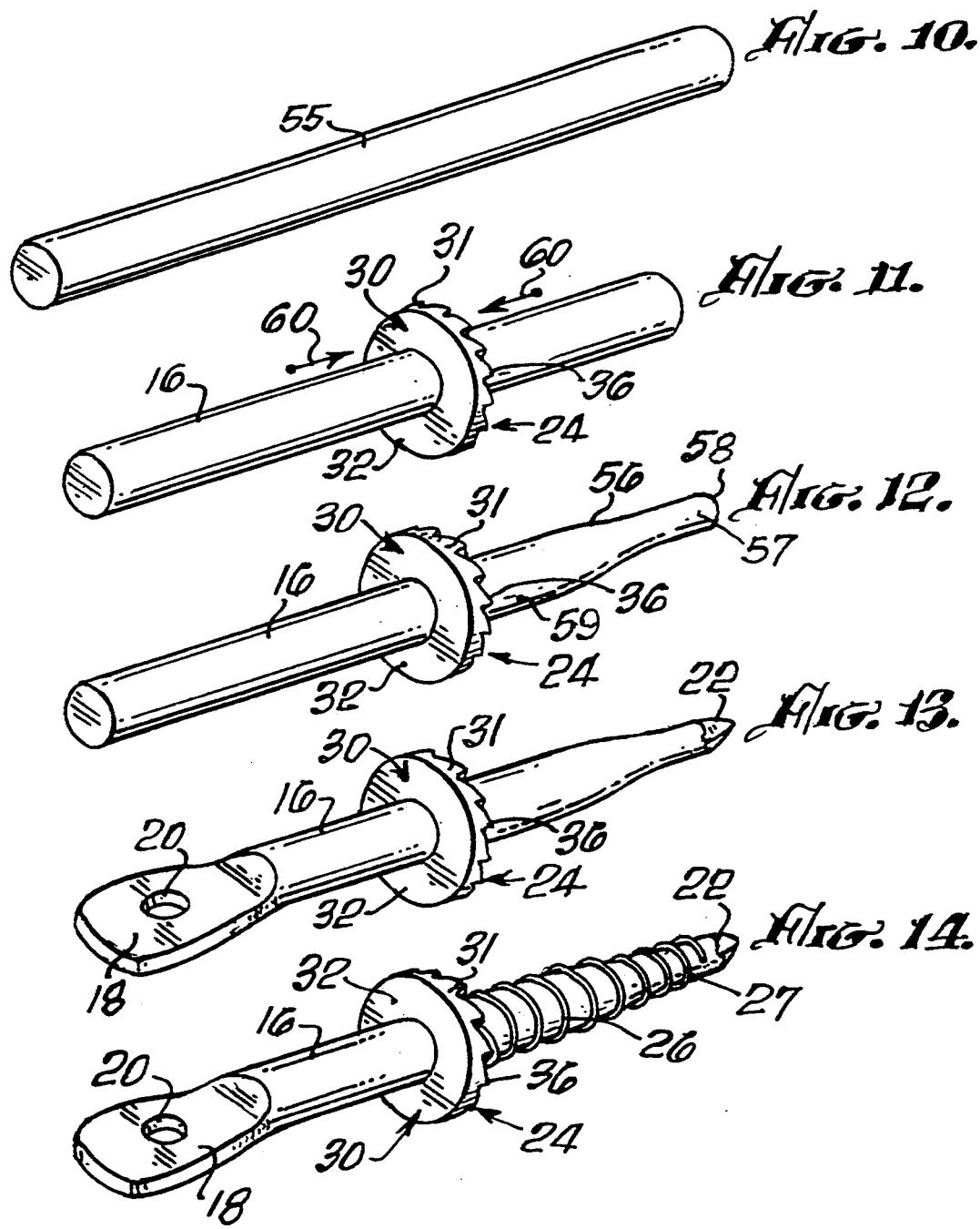

SCREW

TECHNICAL FIELD

This invention pertains to a screw for a particular use in the preparation for a false ceiling frame, and is particularly directed to a novel screw by which overturning in relation to its fully driven position in a thin gauge metal deck structure is prevented while a binding or tight gripping results between the screw's threads and the thin gauge metal deck structure.

BACKGROUND OF THE INVENTION

Screws are illustrated in the following U.S. Letters Patent, hereby made of record: U.S. Pat Nos. 316,650; 1,719,136; and 4,764,069.

PROBLEMS IN THE ART

The ultimate objective sought in the hanging of screws in a thin gauge metal deck structure and by which a false ceiling frame is supported is to achieve an accurate planar level for the false ceiling frame itself, with its mounted ceiling panels being accurately and properly held stationary in a level plane. The fixing of the fully driven positions of a multiple number of these screws in the thin gauge metal deck structure is of primary concern and importance in achieving this ultimate objective. A major problem contributing to the defeat of this objective is the overturning of the screw into the thin gauge metal deck structure thereby causing the screw to fail and pull out of the thin gauge metal deck structure. Sometimes a chain reaction of pulling out occurs, after the weights of wire hangers, false ceiling frames and frame panels act upon the installed screws, resulting in unleveled false ceilings, or even worse, the false ceilings dropping out of their frames. In a less severe situation, only an unleveling of the false ceiling panels would appear to the eye.

Another problem in the art occurs in the actual application of this type of screw to a thin gauge metal deck structure. An operator, standing on the lower floor, below and at a distance from the screw and thin gauge metal deck structure above him, operates or utilizes a hand-held electrically-operated apparatus or pole the end of which holds the screw and turns it as it penetrates the thin gauge metal deck structure. A wobbling of pole occurs in the hands of the operator during this operation, the wobbling tending to form a larger hole in the thin gauge metal deck structure than desired, and which leads to a loosely held screw in the metal deck, contributing to the defeat of the noted ultimate objective of the invention.

U.S. Pat. No. 316,650 to Perkins teaches the formation of a single-piece stop-ring or base formed midway of its screw or drive hook, the ring stopping the insertion of the screw into wood and providing an ornamental appearance to it after such insertion. U.S. Pat. No. 1,719,136 to Rosenberg utilizes a separately formed bowl-shaped collar or washer invertedly mounted in its position on a screw, the circular edge of the collar including serrations or teeth that engage metal of a sheet into which the screw is driven, the result being that a direct longitudinal withdrawal of the body of the screw is practically impossible. U.S. Pat. No. 4,764,069 to Reinwall et al discloses a self-drilling tap mounted on a distal end of a fully threaded stud and a seperate stud holder or driving head, threadable to the stud at its other end and including an aperture for a wire hanger that is utilized in hanging a false ceiling frame.

However, none of these or other known prior art devices speak to the prevention of overturning the fully driven screw and which would strip the screw's threads in the puncture or hole formed in a thin gauge metal deck structure while forming a weld-like binding or attachment between the screw's threads and a boss formed on the puncture or hole in the thin gauge metal deck structure, so that the screw is held tightly by the boss formed in the thin gauge metal deck structure, nor do they speak to an elimination of a loose or looser hole that punctures the thin gauge metal deck structure by the wobbling in the use of an apparatus by which the screw is installed in such structure. This invention speaks to the noted objectives in addition to achieving the binding, gripping or attachment between boss and threads of the screw.

SUMMARY OF THE INVENTION

The inventive concept in this invention is to provide for a self-drilling screw that penetrates and is held securely and tightly to a thin gauge metal deck structure in its fully driven position therein, without stripping the threads formed in the hole's boss, and from which considerable weight is to hang, such as in terms of wire hangers, false ceiling frames and panels, lights, etc. The screws securely mount and are tightly held in the thin gauge metal deck structure, so that once installed, the screw, and a plurality of them, do not overturn fully driven and fixed positions in such installation, thus causing stripping of threads formed in the boss of the hole in which the screw and screws are mounted. In the subject matter of this invention, a driving head with an aperture is formed at one end of the screw, while a tap or drill is mounted on the driven end of the screw, while along the length of the body of the screw sets of different sized threads are formed between the tap and an annular member integrally formed along such length. The smaller sized set of threads are disposed adjacent the tap while the larger set of threads extend from the smaller sized threads to the annular formation. The annular member includes opposing annular surfaces separated by a peripheral edge, the one annular surface that fronts the threads having a plurality of radially extending serrations or teeth formed circumferentially thereon. Each of such serrations or teeth extend from substantially the body of the screw to the peripheral edge of the annular member. The pattern of direction of the formation of the radially extending serrations or teeth parallels the turning motion of the screw into its thin gauge metal deck structure. Such serrations or teeth gouge or coerce the metal by their turning against the metal to a point where no further turning can occur thus denying the potential of stripping formed threads or the like in the boss of the hole by the larger sized threads of the screw. During the penetrating of the thin gauge metal deck structure, the smaller sized threads make a preliminary opening after which an upstanding boss is formed about the hole as the larger sized threads of the screw enter the hole. The larger sized threads bind or attach, as in tapping a hole, to the boss. The serrations or teeth coerced or fixed to the thin gauge metal deck structure prevent overturning of the screw into such structure. The result is a properly installed screw, not failing when weighted frames, panels, lights, etc. are added by means of wire hangers. Looseness of screw in its hole is eliminated, stripping of the threads on the hole's boss is denied, and the threads bind or tightly engage to thread-like formation formed in the boss.

An alternative embodiment of the screw includes the above noted features except for the serrations or teeth on its one annular surface. This embodiment is adaptable primarily for other uses although it may be substituted in a thin gauge metal deck structure or elsewhere if suitable, and even as a temporary measure for a screw having serrations or teeth.

An object of this invention is to provide a novel screw for hanging a false ceiling frame from a thin gauge metal deck structure and for other uses.

A further object of this invention is to avoid a hole for a driven screw that would be mounted loosely therein, such as in a thin gauge metal deck structure.

Another object of the invention is to bind a screw by its threads to an upright boss forming the hole through which such threads project.

These and other objects and advantages will become fully apparent by a complete reading of the following description, its appended claims and the accompanying drawing comprising three (2) sheets of fourteen (14) figures.

BRIEF DESCRIPTION OF THE DRAWING

FIG. 1 is a perspective view of the screw of this invention preparatory for introduction to a driving apparatus that drives the screw through a thin gauge metal deck structure.

FIG. 2 is an elevational view, partly in section, of the screw of this invention shown as being supported in a head of the driving apparatus.

FIG. 3 is a plan view of FIG. 2, illustrating the parallel between the circumferential pattern of direction of formation of the plurality of serrations and the turning motion for the screw.

FIG. 4 is a view, partly in section, of the screw of this invention, initially penetrating a thin gauge metal deck structure, a wire hanger for supporting a false ceiling frame being carried therewith.

FIG. 5 is a view similar to that of FIG. 5, showing action of the screw on the thin gauge metal deck structure as it is being driven farther thereinto.

FIG. 6 is a view similar to FIGS. 4 and 5, however, illustrating a 'shouldering out' of a or fully driven screw.

FIG. 7 is a perspective view of an alternative form of the invention.

FIG. 8 is a fragmentary elevational view of an annular formation formed on the screw.

FIG. 9 is a view taken on line 9—9 of FIG. 8.

FIGS. 10–14 are perspective views of fabrications of the screw of this invention prior to its perfected configuration.

BEST MODE OF CARRYING OUT THE INVENTION

Referring now to the drawing wherein reference characters correspond to the numerals following hereinafter, FIG. 1 illustrates a screw 10 of this invention in a position preparatory to introduction into a head 12 of an apparatus or pole by which the screw 10 is turned in the operation of the Invention. U.S. Pat. No. 4,706,380 discloses such an apparatus for use in carrying out an operation of this invention.

Screw 10 comprises a circular body 16 formed from a rigid wire or rod and having a flattened driving head 18 with an aperture 20 therein formed at its one end and a self-drilling tap or drill 22 formed at its other or distal end. Intermediate the length of screw 10, an annular member 24 is integrally formed. Between the annular member 24 and the tap 22, two sets 26, 27 of threads are formed on the body 16. The set 26 of threads is formed in the larger portion of body 16, extending from the annular member 24 towards the distal end of the screw 10, meeting the set 27 of smaller sized threads that are formed in a smaller sized portion of body 16 and which are substantially the same size as the tap 22 mounted on the distal end of the screw 10. The tap 22 is not of the same size as the threads in set 26, but smaller in size.

The annular member 24 comprises an integrally formed solid annular formation 30 that includes a peripheral edge 31 separating two (2) opposing surfaces 32 (FIG. 8). On the one annular surface 32 fronting the threads 26, a plurality of serrations or teeth 36 is radially formed.

As shown in FIGS. 8, 9, the configuration of each of the serrations or teeth 36 comprises an areal back 38 extending radially outwardly from the body 16 of the screw 10, inclining upwardly to its highest degree at which its tip or biting element 40 is located. From the tip 40 each tooth drops along its face 41 to the latter's lowest degree or depth 42, at which the areal inclination forming the back 38 for the next serration or tooth in their circumferential pattern begins. The circumferential pattern of direction of formation of the plurality of serrations or teeth 36 parallels the turning motion for screw 10 as it is driven into a thin gauge metal deck structure 44 (FIGS. 4, 5). The figures of the drawing, particularly FIGS. 2, 4, 5, 6, and 8, illustrate such circumferential pattern of direction of the serrations or teeth; in this drawing illustration to be in a counter-clockwise manner as the pattern is directly viewed in FIGS. 3 and 9. These paralleling patterns, the circumferential pattern of direction of formation for the serrations or teeth and the direction of motion of turning the screw in an application of the invention, assure that the tip or biting element 40 of the screw 10 gouges or coerces a thin gauge metal deck structure 44 as the screw turns, so that there is a fully driven position at which the screw stops turning. Each serration or tooth 36 radially extends substantially from the body 16 of the screw 10 to the peripheral edge 31 of the annular member 24 to obtain a maximum gouging or coercion of the structure 44. It should be understood that the areal backs 38 and the faces 41 are not respectively necessarily restricted to a geometrical rectangle or square, and the tips 41 of the serrations or teeth may or may not be in the same plane as its corresponding annular surface 32, due to manufacturing limitations in equipment used to fabricate the screw 10.

In operation of the invention, a screw 10 is introduced into the driving head 12 of the apparatus, FIGS. 1, 2, and held in fixed position therein, with the one annular surface 32 of the annular member 24 seated on a shoulder 46 in the apparatus head 12. A wire hanger 48 is thrust through the aperture 20 of the driving head 18 of the screw while mounted on the shoulder 46, and the screw 10 now is ready for application to the thin gauge metal deck structure 44. FIGS. 4, 5, and 6 include in their illustrations a light-weight cured concrete layer 50 mounted on or located atop the thin gauge metal deck structure 44, and which represents an actual environment in which application of this type of screw is carried out. As the apparatus and its head 12 turns screw 10, the tap 22 penetrates, FIG. 4, the thin gauge metal deck structure 44, forming a preliminary hole 51, FIG. 4, of a smaller size than the final hole to be formed, due to the smaller sized set 27 of threads that penetrate and project through the thin gauge metal deck structure 44. As the larger sized set 26 of threads begins to penetrate the thin gauge metal deck structure 44, FIG. 5, an upstanding inwardly-directed (towards the concrete layer 50) definitive circular boss 52 is formed, while a hole 53, FIG. 5, larger than hole 51, is formed by reason of the larger set 26 of threads penetrating the structure 44. The head 12 of the apparatus advances to the thin gauge metal deck structure 44, FIG. 5, and the serrations or teeth 36 engage the thin gauge metal deck structure 44. As the apparatus' head 12, with the screw 10 in it, continues to turn, FIG. 6, the tips or biting elements 40 of the serrations or teeth 36 gouge or coerce the metal, and their faces 41 effect a fully driven position for the screw, which prevents overturning of the screw that causes a stripping action on thread-like formations formed on the boss 52. The set 26 of threads bind to or are gripped to the upright boss 52 of the larger hole 53. In a manner of speaking, the set 26 of threads tap-like to boss 52. The aperture 20 in the head 18 of the screw now is in a fixed planar position relative to any false ceiling frame that is to be mounted to the other end (not shown) of the wire hanger 48 that is being supported in the aperture 20. The boss 52 and the threads on set 26 of threads provide a secure and tight gripping of screw to the thin gauge metal deck structure 44.

In fabricating screw 10, FIGS. 10–14, a cold heading step is first undertaken on a length of rod or wire 55, FIG. 10, taken, for example, from a roll of wire, to produce or form, FIGS. 11, 12, the body 16, its annular member 24 with its formation of serrations or teeth 36, and a tapering portion 56, FIG. 12, this all in the same step. In so doing, a smaller sized portion 57 of body 16 is formed between the tapering portion 56 and the distal end 58 of the rod, while the same size 59 of body 16 remains between the tapering portion 56 and the annular formation 24. The formation of the annular member 24 and its formations 36 are accomplished by a raising or forcing up of a portion of the surface or length of rod or wire 55, compressing it toward the center of the screw, in the direction of the arrows 60, FIG. 11, with the use of dies. The tapering portion 56 is forcibly extruded from the dies. Thereafter, FIG. 13, the tip of the distal end 58 is shaped, into the tap or drill 22. In the step illustrated by FIG. 14, thread rolling to body 16 is accomplished by rollable dies on portions 57 and 59, with the threads on body portion 59 being terminated at the serrations or teeth 36. The step, FIG. 13, of forming the stamped head 18 and its pierced aperture 20 may be taken at an efficient point in the steps of fabricating screw 10. Heat treating (and plating if desired) are undertaken, the heat treating strengthening the screw's threads.

An alternative embodiment 70 is illustrated in FIG. 7, and includes all of the above described features except for the serrations or teeth 36 on the annular member 24.

It may be noted that during the application or operation of the invention to a thin gauge metal deck structure, while wobbling of the screw 10 in its rotating mode may occur, even though a smaller hole 51 first punctures the thin gauge metal deck structure, it does not defeat a tightness of gripping between the larger sized set of threads 26 and the upright boss 52, FIG. 6, about the larger-sized hole 53.

Various modifications and changes can be made in the fabrication of screw 10, without departing from the spirit and scope of the invention and the appended claims to this description. For example, the planar level of the tip or biting element 40 or any portion thereof is not restricted to the plane of the annular surface 32. Nor is the circumferential pattern of formation of direction for the serrations or teeth 36, illustrated as being in a clockwise fashion (when viewing them from the standpoint of FIG. 3), be limited to such clockwise fashion, so long as their circumferential pattern of direction of formation parallels the turning motion of the screw in its application to a thin gauge metal deck structure or the like. The number of threads in set 27 may be as little as one (1). The inventive concept extends to a loose annular member or washer 24 about body 16, as long as the set 26 of threads extend to such member 24. The sets 26, 27 of threads also are considered as major and minor outside diameters of one set of threads.

INDUSTRIAL APPLICABILITY

The screws 10 and 70 are applicable in the installation of false ceiling frames in the construction trades, although the invention in the screws is not necessarily limited thereto.

What is claimed is:

1. A screw having a body of a length between a first and second end, and having a solid annular member that includes a peripheral edge separating opposing annular surfaces, said annular member mounted intermediate such length, said screw including at its first end a driving head with an aperture and at its second end a tap, two sets of differently sized threads formed on said body of the screw between the annular member and the tap, the larger set of threads extending from the annular member towards the smaller sized set of threads, the smaller sized set of threads extending towards the tap, and one or more radially extending serrations formed on and around said annular member on the one of said annular surfaces fronting said sets of threads, each one of said radially extending serrations comprising an inclined areal back and a face meeting said inclined areal back to form a biting edge for said one or more of said radially extending serrations, the circumferential pattern of direction of formation of said one or more radially extending serrations paralleling the turning motion of the screw in its application.

2. The screw of claim 1 wherein said screw is a heat treated screw.

3. In a screw having a body including a length and a driving head at one end of its length and a self-drilling tap mounted at the other end of its length, a solid annular formation mounted about the body along its length and having a peripheral edge separating a first annular surface and a second annular surface, the improvement comprising two sets of different-sized threads mounted on the body along its length between the annular formation and the tap, the larger of said sets of threads extending from the annular formation toward the smaller set of threads and the smaller set of threads extending towards the tap, and one or more radially extending serrations formed on and around said annular member on its first annular surface facing said sets of threads, each one of said radially extending serrations comprising an inclined areal back and a face meeting said inclined areal back to form a biting edge for said one of said radially extending serrations, said serrations formed in a circumferentially pattern paralleling the direction of turning motion for the screw in its application.

4. In the improvement of the screw of claim 2, the screw being a heat treated one.

5. The screw of claim 1 or claim 2 wherein said sets of threads constitute major and minor threads of a set of threads.

6. The screw of claim 1 or claim 2 wherein said annular member is integrally formed on the body of the screw.

7. In the screw of claim 1 or claim 2 or claim 3 or claim 4, the screw being made from a piece of rod or wire.

8. In the screw of claim 7, said annular member being integrally formed to said body of the screw.

9. In the screw of claim 1 or claim 2 or claim 3 or claim 4, said annular member being integrally formed to said body of the screw.

10. In the improvement of the screw of claim 3 or claim 4, the sets of threads constituting major and minor threads of a set of threads.

11. In the improvement of the screw of claim 3 or claim 4, the sets of threads constituting major and minor threads of a set of threads.

12. The combination of a formed upright boss forming a hole in a thin gauge metal structure and the metal of the thin gauge metal structure surrounding said boss forming said hole, with a second set of threads on a screw having a body, the second set of threads penetrating said hole gripping tightly said boss, said screw including one or more serrations radially extending from said body of the screw, the one or more serrations formed on an annular member on the screw, the second set of threads extending to the annular member, each one of said radially extending serrations comprising an inclined areal back and a face meeting said inclined areal back to form a biting edge for said one or more of said radially extending serrations, the pattern of direction of said serrations being in the direction of turning for the screw, so that the screw in its fully driven position at which the serrations coerce the metal surrounding said hole does not overturn to strip the threads in the hole, the screw including a first set of threads that first has made a smaller preliminary hole through the thin gauge metal structure by means of a tap on a distal end of the screw.

13. In the combination of claim 12, the screw being a heat treated one.

* * * * *